United States Patent
Prakah-Asante et al.

(10) Patent No.: US 10,583,840 B2
(45) Date of Patent: Mar. 10, 2020

(54) METHODS AND APPARATUS TO MONITOR AN ACTIVITY LEVEL OF A DRIVER

(71) Applicant: Ford Motor Company, Dearborn, MI (US)

(72) Inventors: Kwaku O. Prakah-Asante, Commerce Township, MI (US); Gary Steven Strumolo, Canton, MI (US); Reates Curry, Ann Arbor, MI (US); Mike Blommer, Ann Arbor, MI (US); Radhakrishnan Swaminathan, Grand Blanc, MI (US)

(73) Assignee: FORD MOTOR COMPANY, Dearborn, MI (US)

( * ) Notice: Subject to any disclaimer, the term of this patent is extended or adjusted under 35 U.S.C. 154(b) by 0 days.

(21) Appl. No.: 16/330,815

(22) PCT Filed: Sep. 8, 2016

(86) PCT No.: PCT/US2016/050772
§ 371 (c)(1),
(2) Date: Mar. 6, 2019

(87) PCT Pub. No.: WO2018/048407
PCT Pub. Date: Mar. 15, 2018

(65) Prior Publication Data
US 2019/0232966 A1  Aug. 1, 2019

(51) Int. Cl.
*G08B 23/00* (2006.01)
*B60W 40/08* (2012.01)
(Continued)

(52) U.S. Cl.
CPC ............ *B60W 40/08* (2013.01); *B60W 50/14* (2013.01); *G06F 3/013* (2013.01);
(Continued)

(58) Field of Classification Search
CPC ............... B60W 40/08; B60W 50/14; B60W 2050/143; B60W 2040/0818; G06K 9/00845; G06F 3/013; G08B 21/06
(Continued)

(56) References Cited

U.S. PATENT DOCUMENTS 6,927,694 B1    8/2005  Smith et al.
8,698,639 B2    4/2014  Fung et al.
(Continued)

FOREIGN PATENT DOCUMENTS

DE    102004022581    4/2005
DE    102008007149    10/2008
(Continued)

OTHER PUBLICATIONS

International Searching Authority, "Search Report," issued in connection with International Patent Application No. PCT/US16/50772, dated Nov. 21, 2016, 3 pages.
(Continued)

*Primary Examiner* — Tanmay K Shah
(74) *Attorney, Agent, or Firm* — Brandon Hicks; Hanley, Flight & Zimmerman, LLC

(57) ABSTRACT

Methods and apparatus to monitor an activity level of a driver are disclosed. An example method includes receiving, at a processor, eye movement data from a sensor monitoring eye movements of a driver of a vehicle. The method includes calculating, via the processor, an eye movement activity index using a substantially real-time recursive analysis of the eye movement data. The method further includes calculating, via the processor, a low activity indicator for the driver based on the eye movement activity index. The method also includes executing a task based on the low activity indicator.

20 Claims, 5 Drawing Sheets

(51) Int. Cl.
*G08B 21/06* (2006.01)
*B60W 50/14* (2020.01)
*G06F 3/01* (2006.01)
*G06K 9/00* (2006.01)

(52) U.S. Cl.
CPC ......... *G06K 9/00845* (2013.01); *G08B 21/06* (2013.01); *B60W 2040/0818* (2013.01); *B60W 2050/143* (2013.01)

(58) Field of Classification Search
USPC .......................................................... 340/576
See application file for complete search history.

(56) References Cited

U.S. PATENT DOCUMENTS

| | | | |
|---|---|---|---|
| 8,914,192 B2 | 12/2014 | Prakah-Asante et al. | |
| 9,205,844 B2 | 12/2015 | Yang et al. | |
| 2013/0226408 A1* | 8/2013 | Fung | B60W 40/09 701/41 |
| 2014/0139655 A1* | 5/2014 | Mimar | G08B 21/06 348/77 |
| 2015/0088397 A1* | 3/2015 | Burton | A61B 5/18 701/70 |
| 2015/0296135 A1* | 10/2015 | Wacquant | G06F 3/013 348/207.11 |
| 2017/0177959 A1* | 6/2017 | Boos | G06K 9/00845 |
| 2017/0267251 A1* | 9/2017 | Roberts | B60W 40/08 |
| 2019/0167672 A1* | 6/2019 | Yamashita | C07D 409/12 |

FOREIGN PATENT DOCUMENTS

| | | |
|---|---|---|
| DE | 102009016936 | 11/2009 |
| FR | 2848010 | 6/2004 |
| WO | 2016070981 | 5/2016 |

OTHER PUBLICATIONS

International Searching Authority, "Written Opinion," issued in connection with International Patent Application No. PCT/US16/50772, dated Nov. 21, 2016, 5 pages.

* cited by examiner

METHODS AND APPARATUS TO MONITOR AN ACTIVITY LEVEL OF A DRIVER

FIELD OF THE DISCLOSURE

This disclosure relates generally to driver assistance in motorized vehicles and, more particularly, to methods and apparatus to monitor an activity level of a driver.

BACKGROUND

People who are drowsy, fall asleep, or otherwise become non-attentive while driving a vehicle may pose a serious threat to the safety of themselves as well as those around them. With the rise of advanced driver assistance systems and autonomous vehicles, safety concerns from non-attentive drivers is somewhat mitigated. However, most vehicles are not fully autonomous. Furthermore, regardless of the level of driver assistance provided by a vehicle, the attention or awareness of the driver regarding the vehicle and/or surrounding circumstances may be desirable.

SUMMARY

Methods and apparatus to monitor an activity level of a driver are disclosed. An example method includes receiving, at a processor, eye movement data from a sensor monitoring eye movements of a driver of a vehicle. The method includes calculating, via the processor, an eye movement activity index using a substantially real-time recursive analysis of the eye movement data. The method further includes calculating, via the processor, a low activity indicator for the driver based on the eye movement activity index. The method also includes executing a task based on the low activity indicator.

In another example, a tangible computer readable storage medium includes example instructions that, when executed cause a machine to at least receive eye movement data from a sensor monitoring eye movements of a driver of a vehicle. The instructions also cause the machine to calculate an eye movement activity index using a substantially real-time recursive analysis of the eye movement data. The instructions further cause the machine to calculate a low activity indicator for the driver based on the eye movement activity index. The instructions also cause the machine to execute a task based on the low activity indicator.

An example system includes a sensor to monitor eye movements of a driver of a vehicle. The system further includes a memory and a processor executing instructions stored in the memory to calculate an eye movement activity index using a substantially real-time recursive analysis of eye movement data received from the sensor. The processor is also to calculate a low activity indicator for the driver based on the eye movement activity index. The processor is also to execute a task based on the low activity indicator.

DETAILED DESCRIPTION

Figure 1:
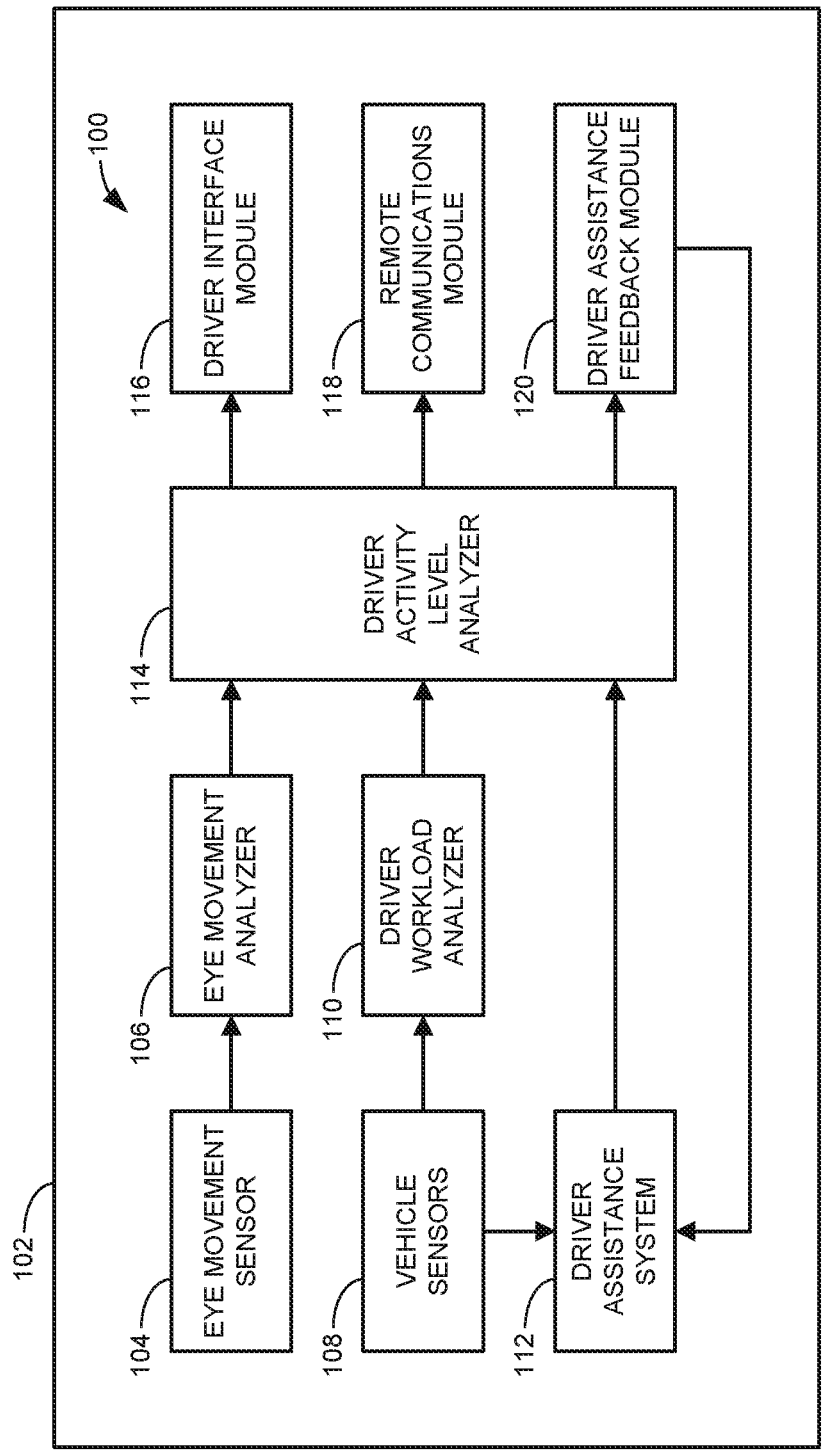
FIG. 1 illustrates an example activity level monitoring system for a vehicle.

Example methods and apparatus implemented in accordance with the teachings disclosed herein enable the determination of an activity level of a driver of a vehicle. As used herein, the activity level of a driver refers to the level of attentiveness or non-attentiveness of the driver to the operation of the vehicle and/or the surrounding circumstances. In some examples, the activity level may be based on the drowsiness of a driver determined based on eye movement data associated with the detection of eyelid movements of the driver (e.g., changes between the eyes being open and the eyes being closed). More particularly, as disclosed below, eyelid movements of the driver may be tracked in substantially real-time and analyzed using a recursive approach to calculate an eye movement activity index. Calculation of the eye movement activity index in this manner enables the analysis and accumulation of ocular anomalies (e.g., eyelid movements other than normal blinking) over time to assess the possibility of reduced levels of engagement or attentiveness by the driver due to drowsiness or fatigue. In some examples, the eye movement activity index is calculated based on a double exponential smoothing of the eye movement data. In some examples, the constants in the recursive filters may be adjusted or configured depending on the desired sensitivity of detecting a potentially low activity (e.g., drowsy) state of the driver.

Additionally or alternatively, in some disclosed examples, the activity level of a driver may be based on the workload of the driver in performing tasks associated with the operation of the vehicle. As used herein, the workload of a driver refers to the visual, physical, and/or cognitive demand on the driver associated with the primary activity of driving (steering, braking, accelerating, etc.) as well as secondary activities (e.g., interfacing with the dashboard, instrument panel, center console, and/or other aspects of the vehicle (e.g., adjusting a seat position, opening/closing a window, etc.)). In some examples, driver workload is inferred based on vehicle operation data received from one or more vehicle sensors that monitor the operation of the vehicle including driver-vehicle interactions, conditions of the vehicle, and/or environmental conditions associated with the vehicle. A driver with a relatively high workload (e.g., indicated by frequent stopping and starting in a high traffic area) is less likely to become disengaged than a driver with a relatively low workload (e.g., indicated by a vehicle maintaining speed on an open highway). Accordingly, in some examples, the workload of a driver determined from vehicle operation data is analyzed to calculate a driver workload activity index that may be indicative of the activity level of the driver. In some examples, the driver workload activity index is based on a long-term analysis of the driving behavior of particular drivers to account for different behaviors of each particular driver.

In some examples, to augment the characterization and/or identification of a driver in a relatively low activity state, a low activity indicator may be calculated using both the eye movement activity index and the workload based activity index. In some examples, the activity indices are weighted using corresponding weighting factors and summed to arrive at a final value for the low activity indicator of the driver. In some examples, other metrics may also be aggregated, with an appropriate weighting, into the final calculation of the low activity indicator indicative of the overall activity level of the driver. The weighting factors for each activity index may be adjusted or configured depending on the particular circumstance. For example, the closer the driver assist state of the vehicle is to full autonomy, the less reliable vehicle operation data will be at indicating the workload of the driver. Accordingly, in such examples, the driver workload activity index may be weighted lower than the eye movement activity index. By contrast, where control of the vehicle is primarily manual (e.g., driver assist features are either not available or not enabled), the vehicle operation data is likely to be more relevant such that the driver workload activity index may be weighted higher than eye movement activity index.

In some examples, different ranges of values for the low activity indicator for the driver are configured into different categories to manage information delivery and machine interaction with the driver. Where the low activity indicator is in a range (e.g., meets a threshold) corresponding to a low activity state of the driver (e.g., drowsy and/or otherwise non-attentive), the driver may be alerted or otherwise reminded to engage with the vehicle and/or the surrounding circumstances. Additionally or alternatively, in some examples, the low activity indicator may be provided to a driver assistance system of the vehicle to take control of some or all of the operations of the vehicle. Further, if the vehicle is already in an autonomous or semi-autonomous driver assist state, the driver assist system may adjust how the vehicle is controlled and/or interacts with the driver in response to the low activity indicator calculated for the driver.

As disclosed herein, the activity indices and/or the resulting low activity indicator for a driver may be accumulated and stored over time for reference by the driver and/or third party entities. For example, such information may be collected for driver training or insurance purposes. Additionally or alternatively, such information may be relayed in substantially real-time to individuals other than the driver (e.g., parents, car rental owners, etc.) to provide added awareness of the activity level of the driver where there may be a reason for a third party to be aware of such information (e.g., novice drivers, elderly drivers with health issues, etc.).

Turning in detail to the drawings, FIG. 1 illustrates an example activity level monitoring system 100 for a vehicle 102. In the illustrated example, the activity level monitoring system 100 includes an eye movement sensor 104 and an eye movement analyzer 106 to analyze eye movement data collected by the eye movement sensor 104. Further, the activity level monitoring system 100 of the illustrated example includes one or more vehicle sensors 108 and a driver workload analyzer 110 to analyze vehicle operation data collected by the vehicle sensors 108. In some examples, the activity level monitoring system 100 includes a driver assistance system 112 to provide assistance to a driver of the vehicle 102. In the illustrated example, the eye movement analyzer 106, the driver workload analyzer 110, and the driver assistance system 112 all provide inputs to a driver activity level analyzer 114. The driver activity level analyzer 114 may provide inputs to a driver interface module 116, a remote communications module 118, and/or a driver assistance feedback module 120.

More particularly, in some examples, the eye movement sensor 104 may be an image sensor (e.g., a camera) built into the vehicle 102 (e.g., the steering wheel, the dashboard, the visor, etc.) with a direct line of sight to the eyes of the driver. In other examples, the eye movement sensor 104 may be worn by the driver (e.g., integrated in wearable eye-tracking glasses). The eye movement sensor 104 generates eye movement data corresponding to detected state changes of the driver's eyelids (e.g., between an open eye state and a closed eye state) in substantially real-time. A typical blink of an eye takes between approximately 0.1 and 0.4 seconds. Thus, in some examples, the eye movement sensor 104 has a significantly faster sampling rate. In some examples, the eye movement sensor 104 has a sampling rate of approximately 200 Hz (0.005 seconds).

In the illustrated example of FIG. 1, the eye movement analyzer 106 receives and analyzes eye movement data received from the eye movement sensor 104. In some examples, the eye movement analyzer 106 analyzes the eye movement data to detect and/or identify eye closures that do not correspond to normal blinking of the driver. That is, in some examples, the eye movement analyzer 106 identifies eye closures with a duration that exceeds the upper limit for the duration of a typical blink (e.g., 0.4 seconds). Eye closures extending longer than the duration of a typical blink may be indicative of fatigue in drivers having difficulty keeping their eyes open.

A single eye closure lasting longer than normal may be insufficient to confidently determine that a driver is fatigued or drowsy. However, in addition to eye closures lengthening in duration when a person becomes tired, the frequency of such eye closures also typically increases. Accordingly, in some examples, the eye movement analyzer 106 tracks eye closures detected by the eye movement sensor 104 over time using a recursive analysis to calculate an eye movement activity index that can be used to estimate the activity state (e.g., level of drowsiness) of the driver in substantially real-time. In some examples, the eye movement analyzer 106 applies a recursive filter to the eye movement data received from the eye movement sensor 104 having the form $$s_k = \alpha_1 s_{k-1} + (1-\alpha_1) x_k \qquad (1)$$

where $x_k$ is the digital value (0 or 1) for the kth sample of the eye movement data provided by the eye movement sensor 104; $s_k$ is the current exponentially computed continuous value of the recursive analysis (ranging from 0 to 1); $s_{k-1}$ is the previously computed $s_k$; and $\alpha_1$ is a tunable constant (ranging from 0 to 1).

In some examples, the output $s_k$ of equation 1 undergoes a second recursive filter having the form $$b_k = \alpha_2 b_{k-1} + (1-\alpha_2) s_k \qquad (2)$$

where $b_k$ is the current exponentially computed continuous value of the second recursive analysis (ranging from 0 to 1); $b_{k-1}$ is the previously computed $b_k$; and $\alpha_2$ is a second tunable constant (ranging from 0 to 1). Thus, in some examples, the recursive analysis implements a double exponential smoothing approach applied to the eye movement data.

The output $b_k$ of equation 2 may be divided by a scaling factor ($\max(b_k)$) to calculate the final continuous eye movement activity index (EM_Index) value as follows:

$$\text{EM\_Index}_k = \frac{b_k}{\max(b_k)} \qquad (3)$$

In some examples, the scaling factor, $\max(b_k)$, corresponds to a maximum value for $b_k$ (e.g., 0.75) determined over a characteristic period of time. In other examples, the scaling factor may be configured as a fixed value (e.g., 1) regardless of the maximum calculated value for $b_k$. Dividing $b_k$ by $\max(b_k)$, as shown in equation 3, scales or normalizes the output values of equation 2 to produce the eye movement activity index with a value ranging from between 0 and 1.

The value of the eye movement activity index at a given point in time is indicative of an activity state of the driver associated with a level of drowsiness or fatigue at the given point in time. In some examples, the higher the eye movement activity index is (e.g., closer to 1), the lower the activity state of the driver. Thus, in some examples, as described more fully below, the activity level monitoring system 100 may initiate certain tasks (e.g., alerting the driver to become more engaged and attentive) when the eye movement activity index meets (e.g., exceeds) a threshold corresponding to a low activity (e.g., drowsy) state.

As mentioned above, the constants or smoothing factors $\alpha_1$ and $\alpha_2$ in equations 1 and 2 may be configured or adjusted according to particular circumstances based on the desired time constant for the recursive analysis and the desired sensitivity in detecting a low activity state of the driver. For example, typical values for the constants may be $\alpha_1=0.99$ and $\alpha_2=0.98$. However, if faster responses are desired (to alert drivers sooner of possibly becoming drowsy), the constants may be set to lower values (e.g., $\alpha_1=0.9$ and $\alpha_2=0.95$). In some examples, the particular values may be configured based on the ability and experience of the driver (e.g., lower constants for novice drivers), the time of day (e.g., lower constants late at night when people are more prone to be tired), or any other factor. In some examples, the particular values for the constants may be determined based on the driver assist state of the vehicle (e.g., lower constants for faster alerts when awareness or attentiveness of the driver is critical to the operation of the driver assistance system 112).

Figure 2:
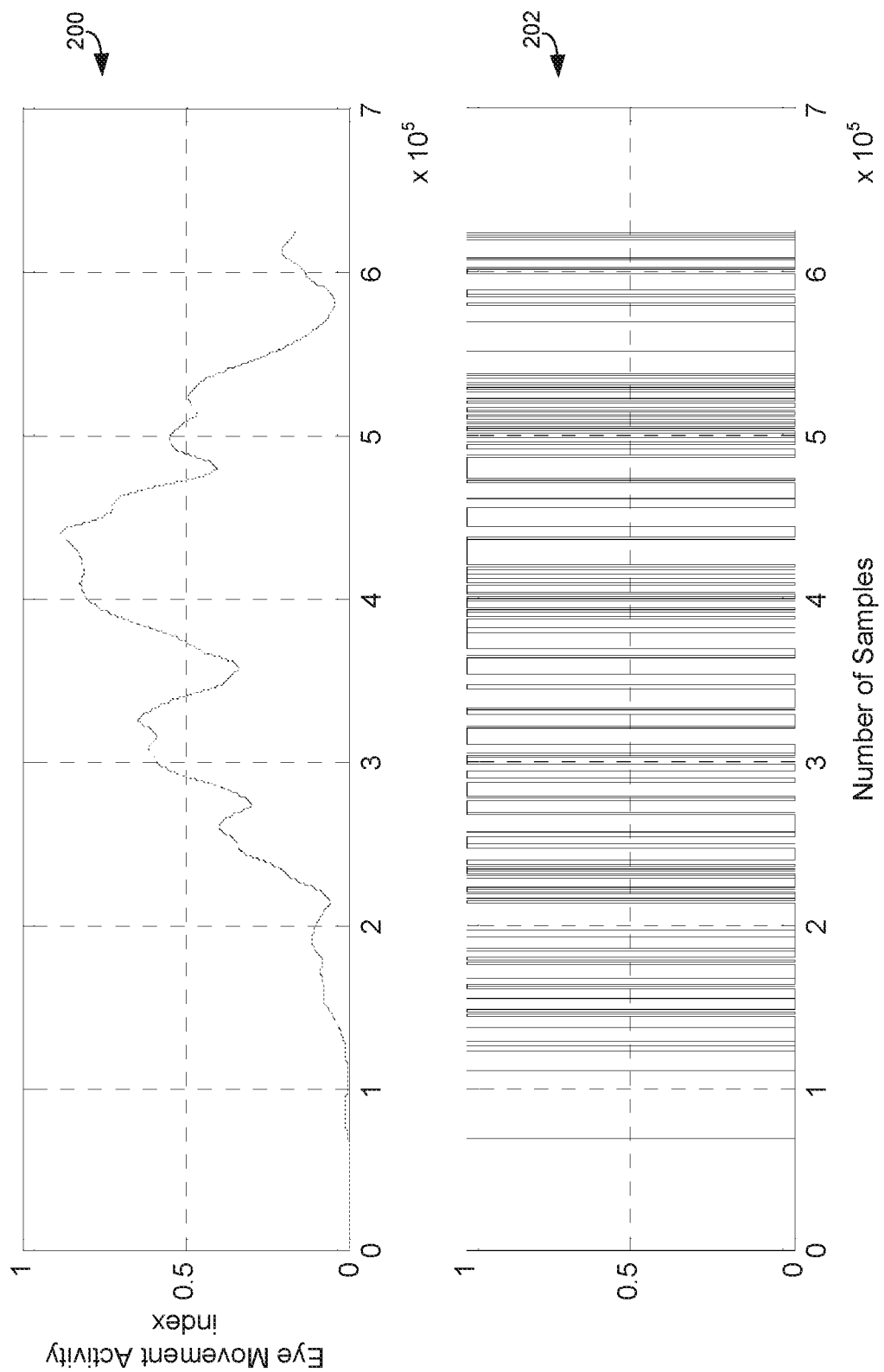
FIG. 2 illustrates graphs representing example eye movement data and a corresponding example eye movement activity index calculated from such data.
Figure 3:
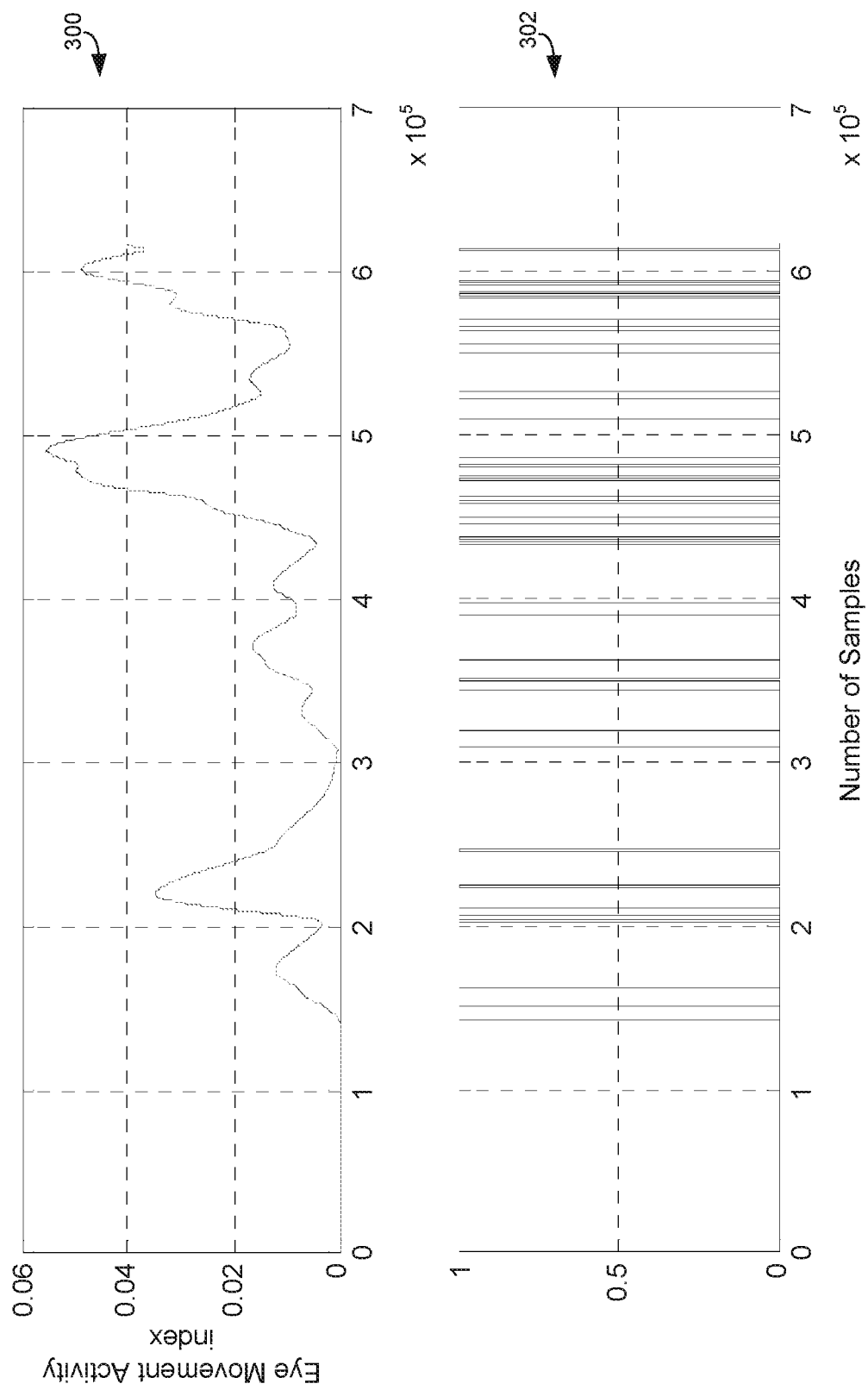
FIG. 3 illustrates graphs representing different example eye movement data and a corresponding example eye movement activity index calculated from such data.

Specific examples of calculated values for the eye movement activity index for drivers with different levels of drowsiness are represented in the graphs 200, 300 of FIGS. 2 and 3. More particularly, the upper graph 200 of FIG. 2 represents the eye movement activity index associated with eye movement data represented in the lower graph 202 of FIG. 2. Similarly, the upper graph 300 of FIG. 3 represents the eye movement activity index associated with eye movement data represented in the lower graph 302 of FIG. 3.

In the illustrated examples, eyelid movements were sampled at 200 Hz (0.005 seconds per sample). Thus, for example, the graph 200 corresponds to a time period span of about an hour. The eye movement data represented in the lower graphs 202, 302 has a value of 1 when the eye movement sensor 104 detects an eye closure that lasts longer than a typical blink (e.g., longer than 0.4 seconds) and has a value of 0 at all other times. That is, in some examples, typical blinks are excluded as inputs into equation 1 of the recursive analysis so that the focus of the analysis remains on eye movements specifically associated with fatigue of the driver. In other words, eye closures represented in the lower graphs 202, 302 of FIGS. 2 and 3 correspond to a successive number of samples of the eye movement sensor 104 associated with a closed eye state spanning a threshold time period (e.g., 0.4 seconds, 0.5 seconds, etc.) without an intervening change of state (e.g., eye opening).

Thus, as can be seen from a comparison of FIGS. 2 and 3, the eye movement data for a first driver represented in the lower graph 202 of FIG. 2 indicates significantly more extended eye closures at a greater frequency than the number of eye closures detected from a second driver as represented in the lower graph 302 of FIG. 3. The different levels of attentiveness (e.g., activity state) of each of the drivers monitored in FIGS. 2 and 3 can be assessed by comparing the upper graphs 200, 300 of FIGS. 2 and 3. In particular, FIG. 2 indicates the driver is in a state of relatively low activity or lack of attentiveness and engagement because the eye movement activity index is relatively high (reaching a peak value of approximately 0.9). By contrast, the driver associated with FIG. 3 is much more engaged and attentive as indicated by the relatively low eye movement activity index that never exceeds 0.1 (reaching a peak value of approximately 0.055). In some examples, as described more fully below, one or more thresholds for the eye movement activity index may be set that, when met (e.g., exceeded), trigger certain actions such as, for example, alerting the driver to wake up or otherwise become more attentive.

Returning to FIG. 1, the vehicle sensors 108 of the activity level monitoring system 100 may be any type of sensor to detect vehicle-driver interactions, conditions of the vehicle, and/or environmental conditions associated with the vehicle. Such information generated by the vehicle sensors 108 is collectively referred to herein as vehicle operation data. In some examples, the vehicle operation data is analyzed by the driver workload analyzer 110 to generate a driver workload activity index similar to the eye movement activity index described above. That is, the driver workload activity index may be another metric indicative of the activity level of the driver determined in substantially real-time. However, unlike the eye movement activity index that is indicative of a driver's activity level based on an inferred level of fatigue or drowsiness associated with collected eye movement data, the driver workload activity index is indicative of the driver's activity level based on the amount of demands on the driver's attention determined from the vehicle operation data.

Generally speaking, the greater the number and/or complexity of demands to which a driver is responding (indicative of a relatively high workload), the less likely that the driver is in a low activity state. More particularly, driver workload (and an associated activity level) may be inferred from different information collected by the vehicle sensors 108 including variations in speed, acceleration, braking, steering, instrument panel and/or center console interactions, the location of the vehicle, the amount of surrounding traffic, the current weather conditions, etc.

As a specific example, vehicle sensors 108 associated with electronic stability control systems including an anti-lock brake system and/or a traction control system may respond to circumstances when the vehicle 102 is operating at or beyond its handling limit. In some examples, it may be assumed that more visual, physical, and/or cognitive attention (e.g., greater workload) is required by a driver to maintain vehicle control as the vehicle 102 approaches its handling limit. Accordingly, in some examples, the driver workload analyzer 110 calculates the driver workload activity index based on how close a driver is to the handling limit of the vehicle 102. In some examples, the driver workload activity index may be scaled from 0 to 1 with values closer to 0 indicative of relatively high engagement and activity by the driver and values closer to 1 indicative of relatively low levels of activity (attentiveness) by the driver. In this manner, the driver workload activity index may be compared with and/or aggregated with the eye movement activity index as described more fully below. Thus, in some examples, a relatively high workload determined when the vehicle 102 is operating near its handling limit results in a relatively low driver workload activity index. Further detail regarding the determining of the handling limit and calculating an associated index is described in U.S. Pat. No. 8,914,192, issued on Dec. 16, 2014, which is hereby incorporated by reference in its entirety.

As another example, it may be assumed that more visual, physical, and/or cognitive attention (e.g., greater workload) is required by a driver when the traffic and/or travel route of the vehicle involves frequent changes in vehicle speed (e.g., changes in accelerator pedal position and/or use of the brake pedal) and/or steering (e.g., lane changes, turning corners, winding roads, etc.). Accordingly, in some examples, the driver workload analyzer 110 calculates the driver workload activity index based on the amount of driver control actions. In some examples, as the frequency, amount, duration, and/or variance in driver control actions increases, the driver workload activity index decreases to indicate a higher activity state of the driver (i.e., greater engagement). Further detail regarding determination of driver control actions and calculating an associated index is described in U.S. Pat. No. 8,914,192 already incorporated above.

In other examples, it may be assumed that more visual, physical, and/or cognitive attention (e.g., greater workload) is required by a driver as the number, frequency, and/or duration of interactions of the driver with the instrument panel and/or other vehicle interfaces increases. The interactions may be touch and/or voice activated. Specific example interactions include the driver using the wiper control, the climate control, the volume control, the turn indicator, the window control, the power seat control, the navigation system, etc. Accordingly, in some examples, the driver workload analyzer 110 calculates the driver workload activity index based on vehicle operation data indicative of such driver-vehicle interactions. In some examples, an increase in driver-vehicle interactions corresponds to an increase in the inferred workload of the driver. As explained above, increases in estimated driver workload correspond to lower values for the driver workload activity index (indicative of higher levels of driver engagement). Further detail regarding the determination of driver-vehicle interactions and calculating an associated index is described in U.S. Pat. No. 8,914,192 already incorporated above.

In other examples, it may be assumed that more visual, physical, and/or cognitive attention (e.g., greater workload) is required by a driver as the headway between the vehicle 102 of the driver and another vehicle (or other object) in front of the vehicle 102 decreases. Accordingly, in some examples, the driver workload analyzer 110 calculates the driver workload activity index based on the headway of the vehicle 102, with a shorter headway corresponding to an increase in the workload of the driver and, thus, a lower value for the driver workload activity index (indicative of relatively high levels of engagement). Further detail regarding the determination of headway and calculating an associated index is described in U.S. Pat. No. 8,914,192 already incorporated above.

In some examples, more than one of the handling limit, driver control actions, driver-vehicle interactions, and/or headway factors described above may be combined to determine the driver workload activity index. Further, other factors may be considered in addition to or instead of those outlined above. The driver workload activity index based on vehicle operation data collected by the vehicle sensors 108 associated with any of these various factors enables an estimation of the activity level of a driver that is independent of the eye movement activity index outlined above. As described further below, in some examples, both of these metrics are combined to calculate an overall low activity indicator for the driver. In this manner, a more robust assessment of the driver is possible to account for more situations and properly detect when a driver is entering a low activity state such that the driver needs to be alerted and/or other actions need to be taken.

As shown in the illustrated example of FIG. 1, the example activity level monitoring system 100 includes the driver assistance system 112. In some examples, the driver assistance system 112 may operate the vehicle 102 in different driver assist states associated with varying levels of autonomous control of the vehicle 102. In some examples, the driver assist states of the vehicle 102 vary from a fully manual state (when the driver assistance system 112 is effectively inactive and the driver has full control of the vehicle 102) to a fully autonomous state (when the driver assistance system 112 is operating the vehicle 102 based on the vehicle operation data received from the vehicle sensors 108 with little or no input from the driver). In some examples, there may also be one or more intermediate driver assist states for the vehicle 102 associated with semi-autonomous control of the vehicle 102 by the driver assistance system 112.

The level of involvement of a driver in operating the vehicle 102 is different for each different machine assist state of the vehicle 102. Thus, the importance of the driver's attention and/or awareness of the vehicle's operation and surrounding circumstances (i.e., the driver's activity level) may also be different depending upon how much control of the vehicle 102 is being accomplished by the driver assistance system 112.

In some examples, an indication of the driver assist state of the vehicle 102 is provided by the driver assistance system 112 as an input to the driver activity level analyzer 114. This input may be used by the driver activity level analyzer 114 in conjunction with the eye movement activity index received from the eye movement analyzer 106 and the driver workload activity index received from the driver workload analyzer 110. In some examples, other metrics of the level of activity of the driver may also be provided as inputs to the driver activity level analyzer 114. In some examples, the driver activity level analyzer 114 computes an aggregated or overall low activity indicator for the driver. In some examples, the low activity indicator is scaled from 0 to 1 with higher values corresponding to lower levels of activity of the driver (e.g., when the driver is drowsy or otherwise non-attentive). More particularly, in some examples, the driver activity level analyzer 114 calculates a weighted composition of the different activity metrics using the following formula:

$$\text{LAI} = \sum_{i=1}^{N} w_i y_i \tag{4}$$

where LAI is the aggregated low activity indicator for the driver; N is the number of driver activity level metrics being aggregated; $y_i$ is the value of each metric; and $w_i$ is the weighting factor assigned to each metric. As an example, if the metrics being considered include the Eye Movement activity Index (EM_Index) and the Driver Workload activity Index (DW_Index) described above, the overall low activity indicator (LAI) for the driver may be expressed as $$\text{LAI} = (\text{EM\_Index})w_1 + (\text{DW\_Index})w_2 \tag{5}$$

where $w_1$ is the weighting factor assigned to the eye movement activity index and $w_2$ is the weighting factor assigned to the driver workload activity index.

In some examples, each of the metrics may be equally weighted. In other examples, particular metrics may be weighted more heavily (e.g., higher) than others. Furthermore, in some examples, the particular weighting factor assigned to each of the metrics may change under different circumstances. For example, different weights may be assigned to each of the metrics for different drivers (e.g., novice driver, teenager driver, elderly driver, etc.). In some examples, different weights may be assigned based on a time of day (e.g., the eye movement activity index may be weighted higher during late night hours when there is an increased likelihood of the driver being tired).

In some examples, the value of the weighting factor assigned to each metric is determined based on the driver assist state of the vehicle 102 provided by the driver assistance system 112. For example, if the vehicle 102 is in an autonomous driver assist state such that the driver assistance system 112 is controlling the speed, acceleration, braking, steering, etc. of the vehicle 102, feedback from the vehicle sensors 108 regarding these operations would not be indicative of an increased demand on the attention (e.g., workload) of the driver. As such, the driver workload activity index calculated based on such data may not be indicative of the actual level of activity of the driver. Accordingly, in some such examples, the eye movement activity index may be assigned a higher weight than what is assigned to the driver workload activity index. In other circumstances, the driver workload activity index may be assigned a higher weight than what is assigned to the eye movement activity index.

In some examples, the weighting factor for one of the metrics may be set to 1 and the weighting factor for other metrics set to 0, which effectively associates a single metric to the low activity indicator for the driver. In some examples, a single metric may be designated as the low activity indicator for a driver without assigning the weighting factors in accordance with equation 4.

After calculating the low activity indicator, the driver activity level analyzer 114 may provide the calculated low activity indicator to one or more of the driver interface module 116, the remote communications module 118, or the driver assistance feedback module 120. In some examples, the driver interface module 116 compares the low activity indicator to a threshold associated with a relatively low level of activity (e.g., a relatively high value for the low activity indicator). In some examples, the driver interface module 116 may execute particular tasks in response to the low activity indicator meeting (e.g., exceeding) the threshold. The tasks may involve the driver interface module 116 generating an alert or reminder for the driver to wake up from a drowsy state and/or otherwise become more attentive. In some such examples, the alert or reminder may be presented to the driver visually (e.g., via a screen or lights), audibly (e.g., via speakers), and/or haptically (e.g., via vibrations in the driver's seat, the steering wheel, etc.). In some examples, different tasks (e.g., different types or durations of alarms) may be associated with different thresholds having different values.

In a similar manner, the remote communications module 118 may compare the low activity indicator to a corresponding threshold associated with a relatively low level of activity and execute particular tasks when the threshold is met. The threshold may be the same as or different than the threshold applied by the driver interface module 116. In some examples, the tasks may involve the remote communications module 118 transmitting an alert to an interested third party (e.g., parent of a teenage driver, rental car owner, insurance company, etc.) of the low level of activity of the driver. In some examples, the remote communications module 118 may relay the low activity indicator to a remote third party independent of any threshold so that the activity level of the driver may be collected over time.

Similarly, the driver assistance feedback module 120 may compare the low activity indicator to a corresponding threshold associated with a relatively low level of activity and execute particular tasks when the threshold is met. The threshold may be the same as or different than the threshold applied by either of the driver interface module 116 or the remote communications module 118. In some examples, the tasks may involve the driver assistance feedback module 120 providing feedback to the driver assistance system 112 to enable the driver assistance system 112 to adjust control of the vehicle 102 depending on the level of activity or attentiveness of the driver represented by the low activity indicator. In some examples, the driver assistance system 112 may communicate with the driver interface module 116 to alert the driver and/or prompt the driver for feedback relating to the autonomous operation of the vehicle 102 based on the value of the low activity indicator.

While an example manner of implementing the activity level monitoring system 100 is illustrated in FIG. 1, one or more of the elements, processes and/or devices illustrated in FIG. 1 may be combined, divided, re-arranged, omitted, eliminated and/or implemented in any other way. Further, the example eye movement sensor 104, the example eye movement analyzer 106, the example vehicle sensors 108, the example driver workload analyzer 110, the example driver assistance system 112, the example driver activity level analyzer 114, the example driver interface module 116, the example remote communications module 118, the example driver assistance feedback module 120, and/or, more generally, the example activity level monitoring system 100 of FIG. 1 may be implemented by hardware, software, firmware and/or any combination of hardware, software and/or firmware. Thus, for example, any of the example eye movement sensor 104, the example eye movement analyzer 106, the example vehicle sensors 108, the example driver workload analyzer 110, the example driver assistance system 112, the example driver activity level analyzer 114, the example driver interface module 116, the example remote communications module 118, the example driver assistance feedback module 120, and/or, more generally, the example activity level monitoring system 100 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example eye movement sensor 104, the example eye movement analyzer 106, the example vehicle sensors 108, the example driver workload analyzer 110, the example driver assistance system 112, the example driver activity level analyzer 114, the example driver interface module 116, the example remote communications module 118, and/or the example driver assistance feedback module 120 is/are hereby expressly defined to include a tangible computer readable storage device or storage disk such as a memory, a digital versatile disk (DVD), a compact disk (CD), a Blu-ray disk, etc. storing the software and/or firmware. Further still, the example activity level monitoring system 100 of FIG. 1 may include one or more elements, processes and/or devices in addition to, or instead of, those illustrated in FIG. 1, and/or may include more than one of any or all of the illustrated elements, processes and devices.

Figure 4:
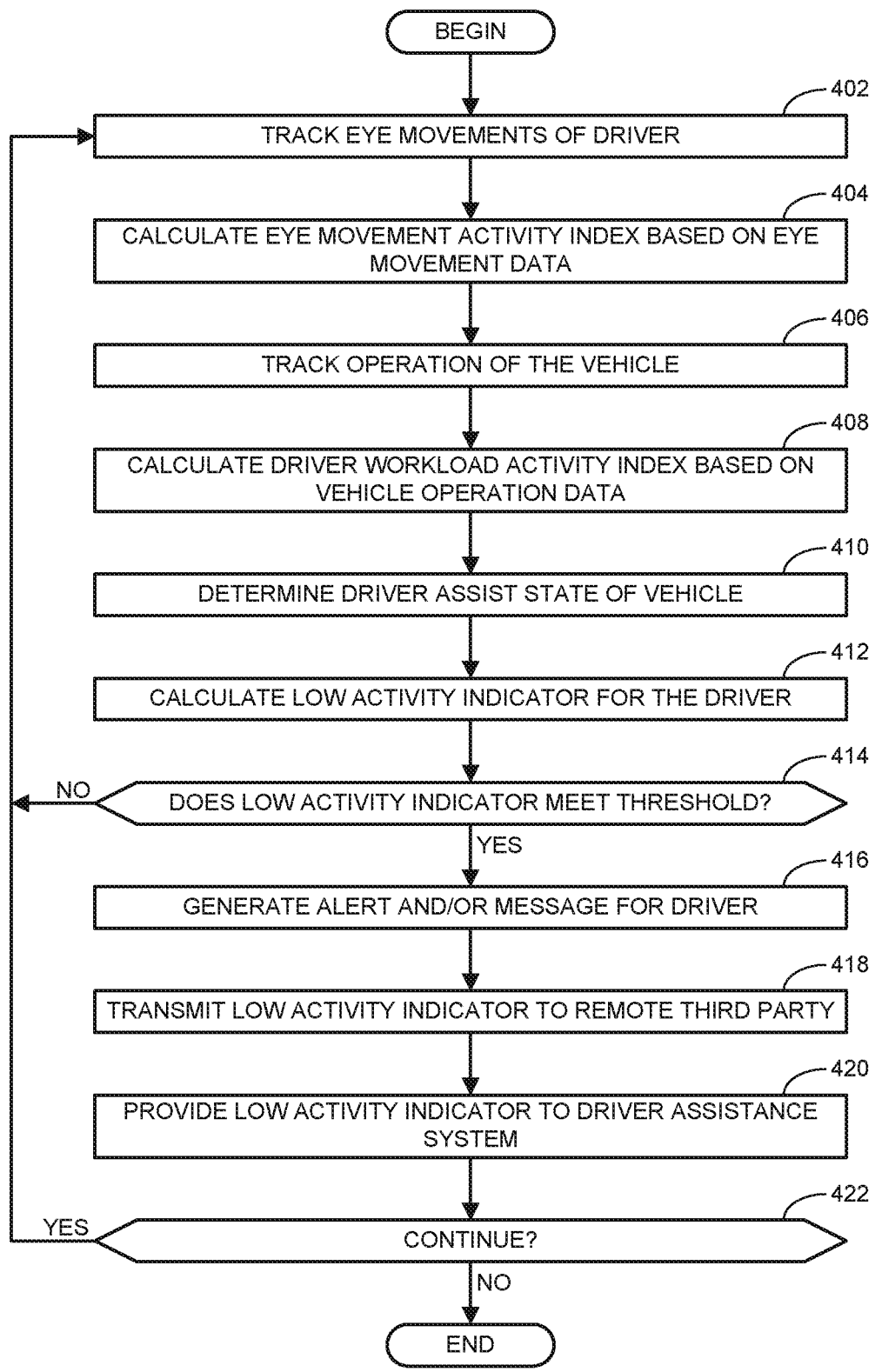
FIG. 4 is a flowchart illustrating an example method to implement the example activity level monitoring system of FIG. 1.

A flowchart representative of an example method for implementing the example activity level monitoring system 100 of FIG. 1 is shown in FIG. 4. In this example, the method may be implemented using machine readable instructions that comprise a program for execution by a processor such as the processor 512 shown in the example processor platform 500 discussed below in connection with FIG. 5. The program may be embodied in software stored on a tangible computer readable storage medium such as a CD-ROM, a floppy disk, a hard drive, a digital versatile disk (DVD), a Blu-ray disk, or a memory associated with the processor 512, but the entire program and/or parts thereof could alternatively be executed by a device other than the processor 512 and/or embodied in firmware or dedicated hardware. Further, although the example program is described with reference to the flowchart illustrated in FIG. 4, many other methods of implementing the example activity level monitoring system 100 may alternatively be used. For example, the order of execution of the blocks may be changed, and/or some of the blocks described may be changed, eliminated, or combined.

As mentioned above, the example method of FIG. 4 may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals and to exclude transmission media. As used herein, "tangible computer readable storage medium" and "tangible machine readable storage medium" are used interchangeably. Additionally or alternatively, the example processes of FIG. 4 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. As used herein, when the phrase "at least" is used as the transition term in a preamble of a claim, it is open-ended in the same manner as the term "comprising" is open ended.

The example method of FIG. 4 begins at block 402 where the example eye movement sensor 104 tracks eye movements of a driver. The detected eye movements are used to generate eye movement data provided to the eye movement analyzer 106. At block 404, the example eye movement analyzer 106 calculates an eye movement activity index based on the eye movement data. In some examples, the calculation involves the application of recursive filters and a scaling factor as described above in connection with equations 1-3. At block 406, the example vehicle sensors 108 track the operation of the vehicle 102. The monitored operation of the vehicle generates vehicle operation data indicative of driver-vehicle interactions, conditions of the vehicle 102, and/or environmental conditions associated with the vehicle 102. At block 408, the example driver workload analyzer 110 calculates a driver workload activity index based on the vehicle operation data.

At block 410, the example driver assistance system 112 determines the driver assist state of the vehicle 102. At block 412, the example driver activity level analyzer 114 calculates a low activity indicator for the driver. In some examples, the low activity indicator is a weighted composition of the eye movement activity index and the driver workload activity index. In some examples, the weighting factors assigned to each activity index are based on the driver assist state of the vehicle 102.

At block 414, the example driver activity level analyzer 114 determines whether the low activity indicator meets a threshold. In some examples, the low activity indicator is scaled to have a value ranging from 0 to 1 with greater values corresponding to a lower activity state of the driver. Accordingly, in some examples, the threshold is met when the low activity indicator is equal to or greater than the threshold. The threshold may be any suitable value (e.g., 0.5, 0.6, 0.75, 0.9, etc.). If the example driver activity level analyzer 114 determines that the low activity indicator does not meet the threshold (e.g., is less than the threshold), control returns to block 402. If the low activity indicator does meet the threshold, control advances to block 416.

At block 416, the example driver interface module 116 generates an alert and/or message for the driver. At block 418, the example remote communications module 118 transmits the low activity indicator to a remote third party. At block 420, the example driver assistance feedback module 120 provides the low activity indicator to the driver assistance system 112. In some examples, block 418 and/or block 420 may be implemented in response to the low activity indicator meeting a different threshold than in block 414. In some examples, block 418 and/or block 420 may be implemented regardless of the value of the low activity indicator. At block 422, the example method either continues by returning control to block 402 or the example method of FIG. 4 ends.

Figure 5:
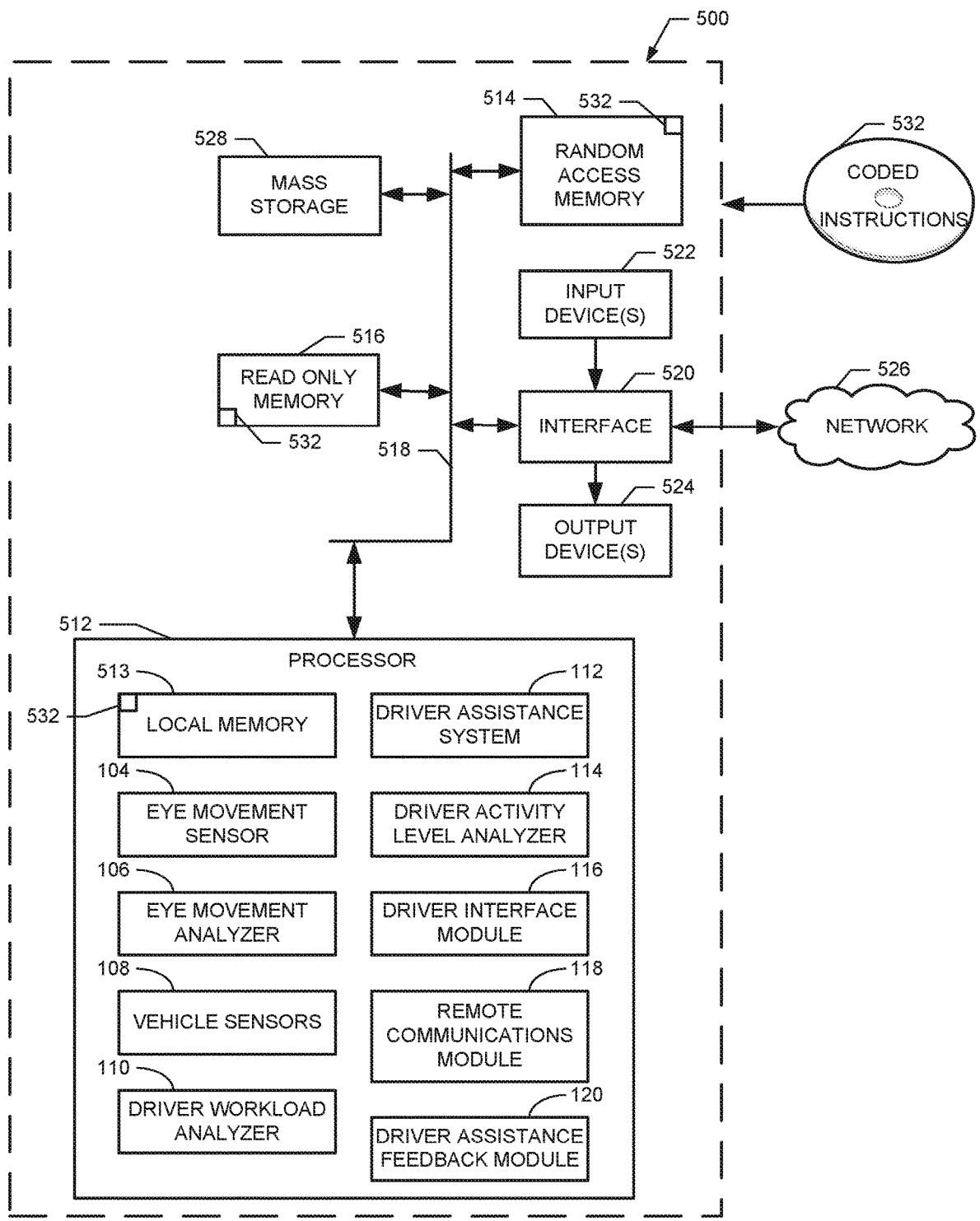
FIG. 5 is a block diagram of an example processor system structured to execute example machine readable instructions represented at least in part by the example method of FIG. 4 to implement the example activity level monitoring system of FIG. 1.

FIG. 5 is a block diagram of an example processor platform 500 capable of executing the method of FIG. 4 to implement the activity level monitoring system 100 of FIG. 1. The processor platform 500 can be, for example, a server, a personal computer, a mobile device (e.g., a cell phone, a smart phone, a tablet such as an iPad™), a personal digital assistant (PDA), an Internet appliance, or any other type of computing device.

The processor platform 500 of the illustrated example includes a processor 512. In some examples, the processor 512 is configured to implemented one or more of the example eye movement sensor 104, the example eye movement analyzer 106, the example vehicle sensors 108, the example driver workload analyzer 110, the example driver assistance system 112, the example driver activity level analyzer 114, the example driver interface module 116, the example remote communications module 118, and/or the example driver assistance feedback module 120. The processor 512 of the illustrated example is hardware. For example, the processor 512 can be implemented by one or more integrated circuits, logic circuits, microprocessors or controllers from any desired family or manufacturer.

The processor 512 of the illustrated example includes a local memory 513 (e.g., a cache). The processor 512 of the illustrated example is in communication with a main memory including a volatile memory 514 and a non-volatile memory 516 via a bus 518. The volatile memory 514 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 516 may be implemented by flash memory and/or any other desired type of memory device. Access to the main memory 514, 516 is controlled by a memory controller.

The processor platform 500 of the illustrated example also includes an interface circuit 520. The interface circuit 520 may be implemented by any type of interface standard, such as an Ethernet interface, a universal serial bus (USB), and/or a PCI express interface.

In the illustrated example, one or more input devices 522 are connected to the interface circuit 520. The input device(s) 522 permit(s) a user to enter data and commands into the processor 512. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 524 are also connected to the interface circuit 520 of the illustrated example. The output devices 524 can be implemented, for example, by display devices (e.g., a light emitting diode (LED), an organic light emitting diode (OLED), a liquid crystal display, a cathode ray tube display (CRT), a touchscreen, a tactile output device, a light emitting diode (LED), a printer and/or speakers). The interface circuit 520 of the illustrated example, thus, typically includes a graphics driver card, a graphics driver chip or a graphics driver processor.

The interface circuit 520 of the illustrated example also includes a communication device such as a transmitter, a receiver, a transceiver, a modem and/or network interface card to facilitate exchange of data with external machines (e.g., computing devices of any kind) via a network 526 (e.g., an Ethernet connection, a digital subscriber line (DSL), a telephone line, coaxial cable, a cellular telephone system, etc.).

The processor platform 500 of the illustrated example also includes one or more mass storage devices 528 for storing software and/or data. Examples of such mass storage devices 528 include floppy disk drives, hard drive disks, compact disk drives, Blu-ray disk drives, RAID systems, and digital versatile disk (DVD) drives.

Coded instructions 532 to implement the method of FIG. 4 may be stored in the mass storage device 528, in the volatile memory 514, in the non-volatile memory 516, and/or on a removable tangible computer readable storage medium such as a CD or DVD.

From the foregoing, it will be appreciated that the above disclosed methods, apparatus and articles of manufacture enable the characterization and/or identification of a driver that is drowsy, non-attentive, or otherwise in a low activity state based on a substantially real-time recursive analysis of eye movements of the driver. Furthermore, the constants used in the recursive analysis may be adjusted or configured to provide more accurate and/or timely monitoring depending on the particular circumstances situation in which the teachings disclosed herein are implemented. Further still, the eye movement activity index resulting from such a recursive analysis may be combined with other activity level metrics (e.g., driver workload) that are appropriately weighted to augment the determination of the activity level of a driver. The weighting of different metrics in this manner further facilitates the configuration and/or customization of driver activity assessment depending on the particular circumstance. Such a particular characterization of a driver enables the provision of alerts and/or information to the driver in a relevant and timely manner to enhance the driving experience. Additionally, driver activity level information may be provided to remote third parties in substantially real-time and/or provide feedback to a driver assistance system of the vehicle to adjust operation of the vehicle.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A method comprising:
receiving, at a processor, eye movement data from a sensor monitoring eye movements of a driver of a vehicle;
calculating, via the processor, a first current continuous value at a point in time by applying a first recursive filter to the eye movement data;
calculating, via the processor, a second current continuous value at the point in time by applying a second recursive filter to the first current continuous value;
calculating, via the processor, an eye movement activity index by scaling the second current continuous value to a normalized value;
calculating, via the processor, a low activity indicator for the driver based on the eye movement activity index; and
executing a task based on the low activity indicator.

2. The method of claim 1, further including executing the task in response to the low activity indicator meeting a threshold.

3. The method of claim 1, wherein the task involves providing an alert to the driver.

4. The method of claim 1, wherein the task involves providing the low activity indicator to a driver assistance system of the vehicle.

5. The method of claim 1, wherein the task involves transmitting the low activity indicator to a remote third party.

6. The method of claim 1, wherein the first recursive filter uses a first constant and the second recursive filter uses a second constant, the first and second constants adjusted based on a desired sensitivity of the eye movement activity index in detecting a potentially low activity state of the driver.

7. The method of claim 1, further including calculating the low activity indicator based on the eye movement activity index and a second activity metric, the eye movement activity index weighted by a first weighting factor, the second activity metric weighted by a second weighting factor.

8. The method of claim 7, further including adjusting the first and second weighting factors based on a driver assist state of the vehicle.

9. The method of claim 7, wherein the second activity metric is a driver workload activity index, the driver workload activity index indicative of an activity level of the driver inferred from an estimated workload of the driver.

10. The method of claim 1, wherein the eye movement data includes an indication of eye closures exceeding a threshold duration and excludes eye closures not exceeding the threshold duration.

11. A tangible computer readable storage medium comprising instructions that, when executed, cause a machine to at least:
   receive eye movement data from a sensor monitoring eye movements of a driver of a vehicle;
   calculate a first current continuous value at a point in time by applying a first recursive filter to the eye movement data;
   calculate a second current continuous value at the point in time by applying a second recursive filter to the first current continuous value;
   calculate an eye movement activity index by scaling the second current continuous value to a normalized value;
   calculate a low activity indicator for the driver based on the eye movement activity index; and
   execute a task based on the low activity indicator.

12. The storage medium of claim 11, wherein the instructions, when executed, further cause the machine to calculate the low activity indicator based on the eye movement activity index and a second activity metric, the eye movement activity index weighted by a first weighting factor, the second activity metric weighted by a second weighting factor.

13. The storage medium of claim 12, wherein the instructions, when executed, further cause the machine to adjust the first and second weighting factors based on a driver assist state of the vehicle.

14. A system comprising:
   a sensor to monitor eye movements of a driver of a vehicle;
   a memory; and
   a processor executing instructions stored in the memory to:
      calculate a first current continuous value at a point in time by applying a first recursive filter to eye movement data, the eye movement data corresponding to the eye movements of the driver;
      calculate a second current continuous value at the point in time by applying a second recursive filter to the first current continuous value;
      calculate an eye movement activity index by scaling the second current continuous value to a normalized value;
      calculate a low activity indicator for the driver based on the eye movement activity index; and
      execute a task based on the low activity indicator.

15. The system of claim 14, wherein the processor is to execute the task in response to the low activity indicator meeting a threshold.

16. The system of claim 15, wherein the task involves providing an alert to the driver.

17. The system of claim 14, wherein the task involves providing the low activity indicator to a driver assistance system of the vehicle.

18. The system of claim 14, wherein the task involves transmitting the low activity indicator to a remote third party.

19. The system of claim 14, wherein the processor is to calculate the low activity indicator based on the eye movement activity index and a second activity metric, the eye movement activity index weighted by a first weighting factor, the second activity metric weighted by a second weighting factor.

20. The system of claim 19, wherein the processor is to adjust the first and second weighting factors based on a driver assist state of the vehicle.

* * * * *